US011918120B2

(12) United States Patent
Huang

(10) Patent No.: US 11,918,120 B2
(45) Date of Patent: Mar. 5, 2024

(54) INFLATABLE BED

(71) Applicant: BESTWAY INFLATABLES & MATERIAL CORP., Shanghai (CN)

(72) Inventor: Shuiyong Huang, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 161 days.

(21) Appl. No.: 17/732,721

(22) Filed: Apr. 29, 2022

(65) Prior Publication Data

US 2022/0346564 A1 Nov. 3, 2022

(30) Foreign Application Priority Data

Apr. 30, 2021 (CN) ......................... 202120929513.6

(51) Int. Cl.
*A47C 27/08* (2006.01)
*A61G 7/057* (2006.01)

(52) U.S. Cl.
CPC .......... *A47C 27/081* (2013.01); *A47C 27/087* (2013.01); *A47C 27/08* (2013.01); *A61G 7/057* (2013.01)

(58) Field of Classification Search
CPC ..... A47C 27/08; A47C 27/081; A47C 27/082; A47C 27/083; A47C 27/087; A47C 27/10; A61G 7/057; A61G 7/05769; A61G 7/05776
USPC .................. 5/706, 710–713, 654, 655.3, 644
See application file for complete search history.

(56) References Cited

U.S. PATENT DOCUMENTS 180,528 A * 8/1876 Boggett ............... A47C 27/081 5/706
187,397 A * 2/1877 Boggett et al. ...... A47C 27/081 5/706

(Continued)

FOREIGN PATENT DOCUMENTS

WO 2018235057 12/2018

OTHER PUBLICATIONS

Extended European Search Report dated Sep. 20, 2022 (dated Sep. 20, 2022) issued on related European patent application 22171018.9 by the European Patent Office.

*Primary Examiner* — Robert G Santos
(74) *Attorney, Agent, or Firm* — DICKINSON WRIGHT PLLC

(57) ABSTRACT

The present utility model relates to an inflatable bed, comprising: a top sheet provided with at least one through hole; a bottom sheet; a lateral confining sheet, an upper edge of the lateral confining sheet being connected to an outer edge of the top sheet, and a lower edge of the lateral confining sheet being connected to an outer edge of the bottom sheet; and at least one tensioning member, the tensioning member comprising: a upper tensioning part, comprising a upper side wall and a bottom, an upper edge of the upper side wall being connected to a periphery of the through hole of the top sheet, so that the upper side wall fits the through hole of the top sheet, and a lower edge of the upper side wall being connected to the bottom; and a lower tensioning part for connecting the bottom of the upper tensioning part to the bottom sheet to form a tensioning effect at least between the bottom of the upper tensioning part and the bottom sheet; wherein the upper tensioning part of the tensioning member, the top sheet, the bottom sheet, and the lateral confining sheet are enclosed to form an inflatable chamber, and after the inflatable chamber is inflated, a recess is formed on a (Continued)

surface of the inflatable bed. The inflatable bed according to the present utility model has better breathability and higher aesthetic degree, and is easy to produce.

20 Claims, 7 Drawing Sheets

(56) References Cited

U.S. PATENT DOCUMENTS

| | | | | |
|---|---|---|---|---|
| 1,673,636 | A | 6/1928 | Perry | |
| 4,942,634 | A * | 7/1990 | Saloff | A47C 27/085 5/655.5 |
| 5,113,540 | A * | 5/1992 | Sereboff | A47C 7/021 297/452.41 |
| 5,195,199 | A * | 3/1993 | Sereboff | A61G 7/05738 5/655.3 |
| 7,406,735 | B2 * | 8/2008 | Lin | A47C 27/081 5/711 |
| 7,591,036 | B2 * | 9/2009 | Lin | A47C 27/081 5/713 |
| 7,636,970 | B2 * | 12/2009 | Lin | A47C 27/081 5/713 |
| 2007/0283499 | A1 * | 12/2007 | Lin | A47C 27/081 5/713 |
| 2008/0209642 | A1 * | 9/2008 | Lin | A47C 27/087 5/713 |
| 2008/0209643 | A1 * | 9/2008 | Lin | A47C 27/081 5/713 |
| 2022/0346564 | A1 * | 11/2022 | Huang | A47C 27/081 |

* cited by examiner

INFLATABLE BED

CROSS-REFERENCE TO RELATED APPLICATION

This application claims priority from Chinese Application CN 202120929513.6 filed Apr. 30, 2021 in China, the disclosure of which is incorporated herein by reference in its entirety.

BACKGROUND

1. Field

Apparatuses and methods consistent with example embodiments relate inflatable products, and in particular to an inflatable bed.

2. Description of the Related Art

Inflatable beds are widely used. When a user touches or presses a surface of an inflatable bed, the surface of the inflatable bed will be in contact with the user, thus limiting heat dissipation therefrom and affecting the comfort of the user. In related art inflatable beds, breathability is not as good as desired, or the structure is sufficiently complex to provide a problem.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, an inflatable bed comprises: a top sheet having a hole therethrough; a bottom sheet; a lateral confining sheet comprising an upper edge connected to an outer circumferential edge of the top sheet, and a lower edge connected to an outer circumferential edge of the bottom sheet; and at least one tensioning member comprising: an upper tensioning part comprising: an upper edge connected to an inner periphery of the hole through the top sheet, and a bottom surface; and a lower tensioning part, the lower tensioning part connected to the bottom surface of the upper tensioning part and to the bottom sheet; wherein the upper tensioning part, the top sheet, the bottom sheet, and the lateral confining sheet are connected together thereby defining an enclosed inflatable chamber.

The lower tensioning part may comprise: a top connected to the bottom surface of the upper tensioning part, and a lower side wall comprising an upper edge connected to the top and a lower edge connected to the bottom sheet, wherein the lower side wall has an air vent formed therethrough, the air vent in communication with the inflatable chamber.

The lower tensioning part may comprise: a lower side wall having an air vent formed therethrough, the air vent in communication with the inflatable chamber, wherein the upper side wall of the upper tensioning part and the lower side wall of the lower tensioning part, together comprise a single integrated structure.

The lower tensioning part may be a hollow body structure defined by a circumferential wall connected to the bottom surface of the upper tensioning part and to the bottom sheet, the hollow body structure comprising an open end providing communication between the inflatable chamber and an interior of the hollow body structure.

The first tensioning part may comprise: an annular structure having an inner circumference defining the upper edge of the upper tensioning part and an outer circumference; and a flat sheet having an outer, annular area having an outer circumference connected to the outer circumference of the annular structure and an inner area defining the bottom surface of the upper tensioning part.

The hole through the top sheet may be one of circular, quadrilateral, and kidney-shaped.

The inflatable bed may further comprise: an oblique draw sheet comprising a first edge connected to one of the top sheet and the bottom sheet and a second edge connected to the lateral confining sheet, the oblique draw sheet having an air vent formed therethrough, the air vent in communication with the inflatable chamber.

A cross sectional shape of the oblique draw sheet may be one of an I shape, a Y shape, and a V shape.

The inflatable bed may further comprise: a breathable layer substantially covering the top sheet and connected to at least one of the top sheet and the lateral confining sheet, wherein the breathable layer is gas-permeable.

The inflatable bed may further comprise a connecting part connecting the breathable layer to the at least one of the top sheet and the lateral confining sheet.

According to an aspect of another example embodiment, an inflatable structure comprises: a top sheet having a plurality of holes therethrough; a bottom sheet; a lateral confining sheet comprising an upper edge connected to an outer periphery of the top sheet and a bottom edge connected to an outer periphery of the bottom sheet; a plurality of tensioning members, each comprising: a tubular structure comprising an upper edge connected to an inner circumferential edge of one of the plurality of holes through the top sheet and a lower edge connected to the bottom sheet; and a cross-sheet having an outer circumference attached to an inner circumference of the tubular structure, between the upper edge and the lower edge.

The tubular structure of each of the plurality of tensioning members may comprise: a first annular structure comprising: a first upper edge defining the upper edge of the tubular structure and connected to the inner circumferential edge of the one of the plurality of holes through the top sheet, a first lower edge defining the inner circumference of the tubular structure and connected to the outer circumference of the cross-sheet; a second annular structure comprising: a second upper edge connected to the cross-sheet, and a second lower edge defining the lower edge of the tubular structure and connected to the bottom sheet.

An air vent may be formed through the second annular structure.

The inflatable structure may further comprise an oblique draw sheet comprising an annular structure comprising an inner circumferential edge connected to one of the top sheet and the bottom sheet and an outer circumferential edge connected to the lateral confining sheet.

The inflatable structure may further comprise: a breathable layer substantially covering the top sheet and connected to at least one of the top sheet and the lateral confining sheet, wherein the breathable layer is gas permeable.

According to an aspect of another example embodiment, an inflatable structure comprises: a top sheet having a plurality of holes therethrough; a bottom sheet; a lateral confining sheet comprising an upper edge connected to an outer periphery of the top sheet and a bottom edge connected to an outer periphery of the bottom sheet; a plurality of tensioning members, each comprising: an upper tensioning part comprising a tubular structure comprising an upper edge connected to an inner circumferential edge of one of the plurality of holes through the top sheet and a lower edge; a lower tensioning part comprising an upper surface connected to the lower edge of the upper tensioning part, a lower surface connected to the bottom sheet, and at least two side surfaces each connected between the upper surface and the lower surface, wherein an inner space defined by the upper surface, the lower surface, and the at least two side sheets is in communication with an inflatable chamber defined by the top sheet, the bottom sheet, and the lateral confining sheet.

The tubular structure of the upper tensioning part may comprise: an annular structure comprising an upper edge defining the upper edge of the upper tensioning part, and a lower edge; a sheet comprising an outer circumferential edge connected to the lower edge of the annular structure; wherein the lower edge of the upper tensioning part is defined as a ring on the sheet within the outer circumferential edge of the sheet.

The at least two side sheets of the lower tensioning part may comprise three side sheets connected between the upper surface and the lower surface of the lower tensioning part on three sides, respectively.

The inflatable structure may further comprise an oblique draw sheet comprising an oblique annular structure comprising an inner circumferential edge connected to one of the top sheet and the bottom sheet and an outer circumferential edge connected to the lateral confining sheet.

The inflatable structure may further comprise a breathable layer substantially covering the top sheet and connected to at least one of the top sheet and the lateral confining sheet, wherein the breathable layer is gas-permeable.

BRIEF DESCRIPTION OF THE DRAWINGS

The above and/or other aspects will become apparent and more readily appreciated from the following description of example embodiments, taken in conjunction with the accompanying drawings, in which: example

DETAILED DESCRIPTION

Figure 1:
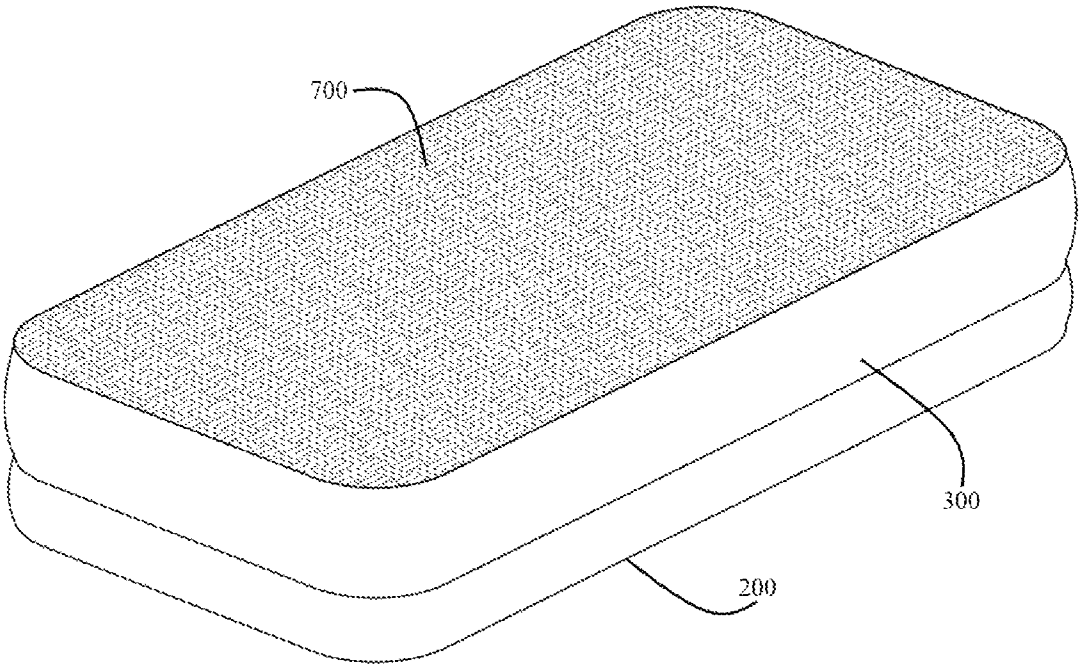
FIG. 1 is a schematic diagram of an inflatable bed according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

Figure 2:
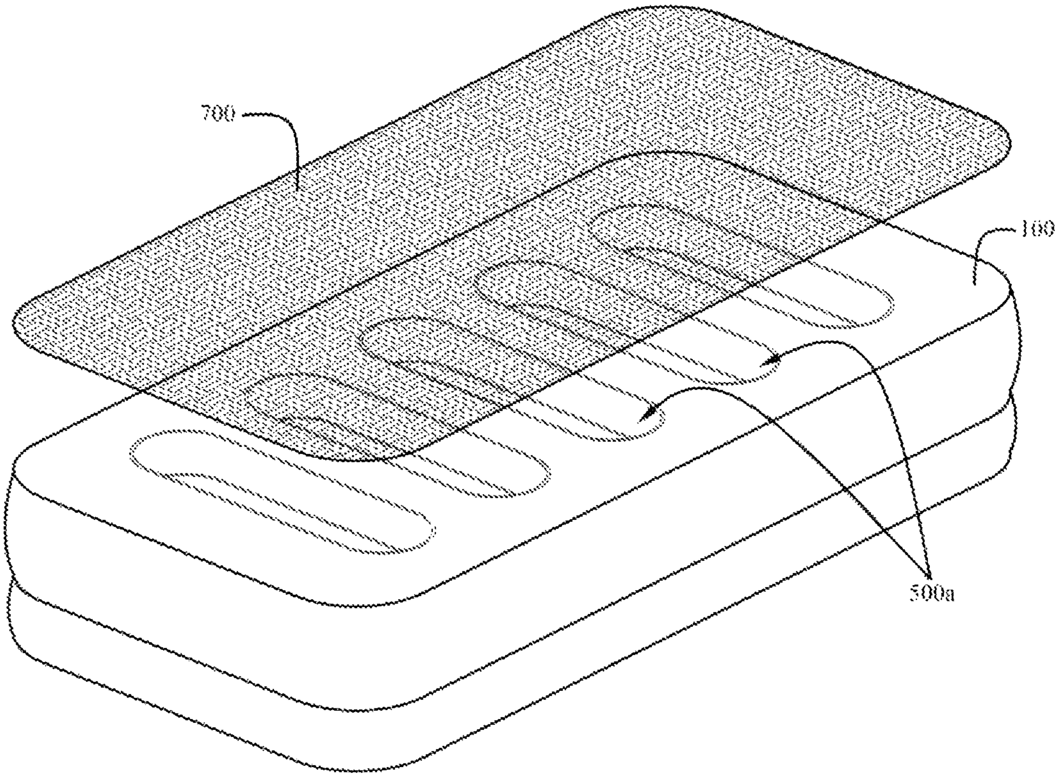
FIG. 2 is a schematic exploded view of the inflatable bed of FIG. 1.

As shown in FIG. 1 and FIG. 2, an inflatable bed, according to an example embodiment, comprises a top sheet 100, a lateral confining sheet 300, a tensioning member (not shown), and a bottom sheet 200. The top sheet 100 is provided with at least one hole therethrough, and the bottom sheet 200 and the top sheet 100 are parallel to each other and are spaced by a certain distance. The bottom sheet 200 has no hole therethrough. An upper edge of the lateral confining sheet 300 is connected to an outer edge of the top sheet 100, and a lower edge of the lateral confining sheet 300 is connected to an outer edge of the bottom sheet 200. The tensioning member comprises an upper tensioning part and a lower tensioning part. The upper tensioning part comprises an upper side wall and a bottom, an upper edge of the upper side wall is connected to an inner periphery of the hole through the top sheet, and a lower edge of the upper side wall is connected to the outer periphery of the bottom. The lower tensioning part is connected to the bottom of the upper tensioning part and to the bottom sheet. When the inflatable bed is in an inflated state, the upper tensioning part forms a recess 500*a* in an upper surface of the inflatable bed. Convection of airflow can take place inside and outside the recess 500*a*, thereby improving breathability.

The inflatable bed further comprises a breathable layer 700 located above the top sheet 100 and connected to the top sheet 100. Convection and airflow can take place through the breathable layer 700. The breathable layer 700 may also be connected to the lateral confining sheet 300 or is connected to a connecting part of the top sheet 100 and the lateral confining sheet 300.

Figure 3:
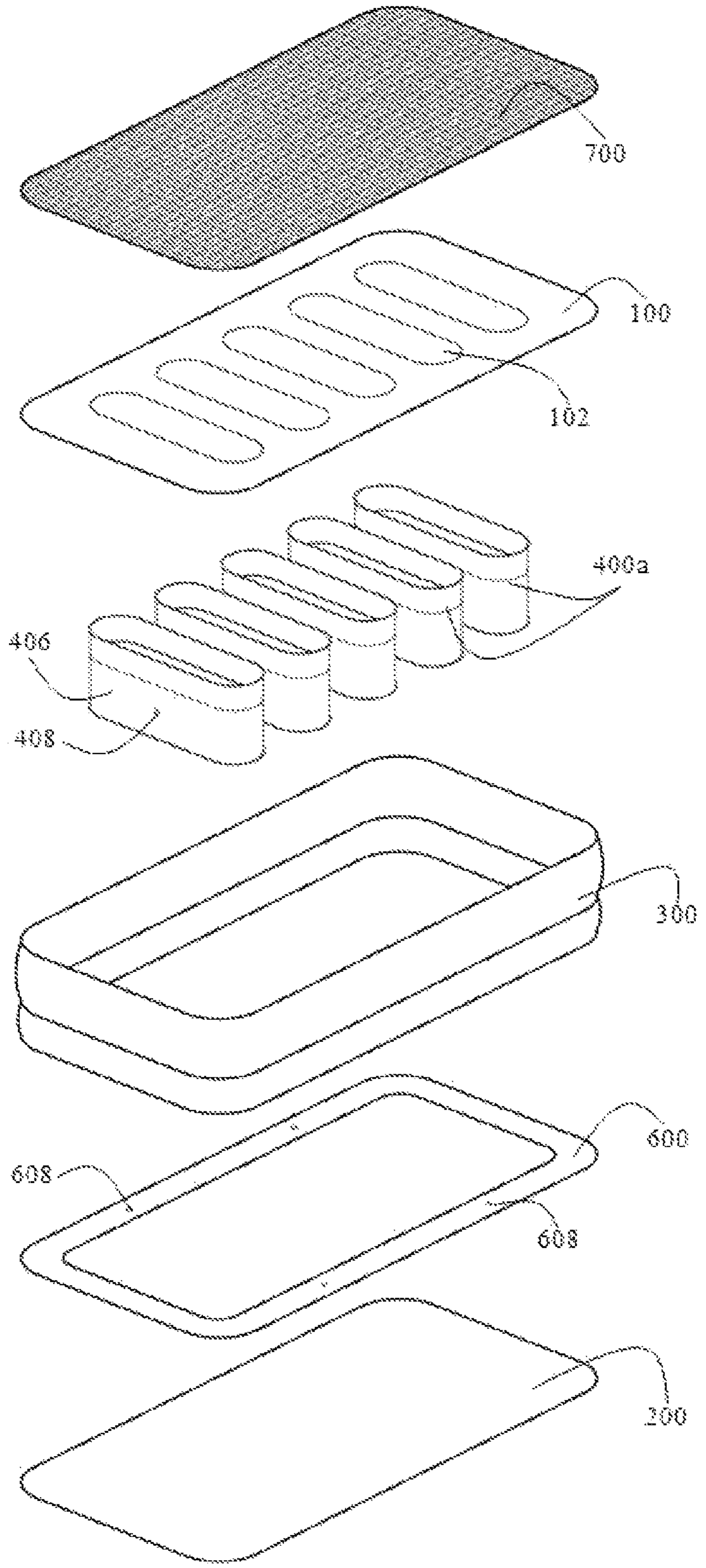
FIG. 3 is a further exploded view of the inflatable bed of FIG. 1.

FIG. 3 illustrates a further exploded view of the inflatable bed of FIG. 1. As shown, the inflatable bed comprises the breathable layer 700, the top sheet 100, a tensioning member 400*a*, the lateral confining sheet 300, an oblique draw sheet 600, and the bottom sheet 200. The top sheet 100 and the bottom sheet 200 are spaced apart from each other, and the tensioning member 400*a*, the lateral confining sheet 300, and the oblique draw sheet 600 are provided between the two. The top sheet 100 has a number of holes 102 formed therethrough, and each of the holes 102 corresponds to one tensioning member 400*a* to thereby form one recess 500*a* on the surface of the inflatable bed. FIG. 3 illustrates five holes 102 and five corresponding tensioning members 400*a*. However, there may be fewer or more holes 102 and tensioning members 400*a*. Additionally, FIG. 3 illustrates that the holes 102 and the cross-section of the tensioning members 400*a* are oblong and substantially oval; however, these may take any of a number of shapes, including kidney-shaped, or circular, as would be understood by one of skill in the art. As shown in FIG. 2, the recesses 500*a* may extend in a widthwise direction of the inflatable bed and may be arranged at intervals in a lengthwise direction of the inflatable bed. The lateral confining sheet 300, the top sheet 100, the bottom sheet 200 and the upper tensioning part are enclosed to form an inflatable chamber.

Figure 4:
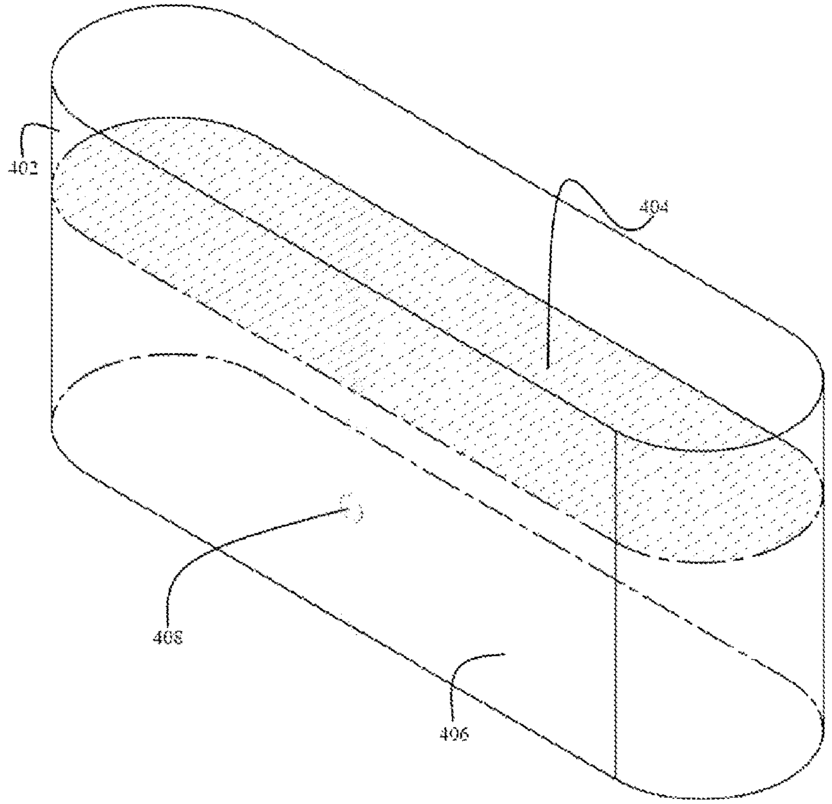
FIG. 4 is a schematic diagram of a tensioning member according to an example embodiment.
Figure 5:
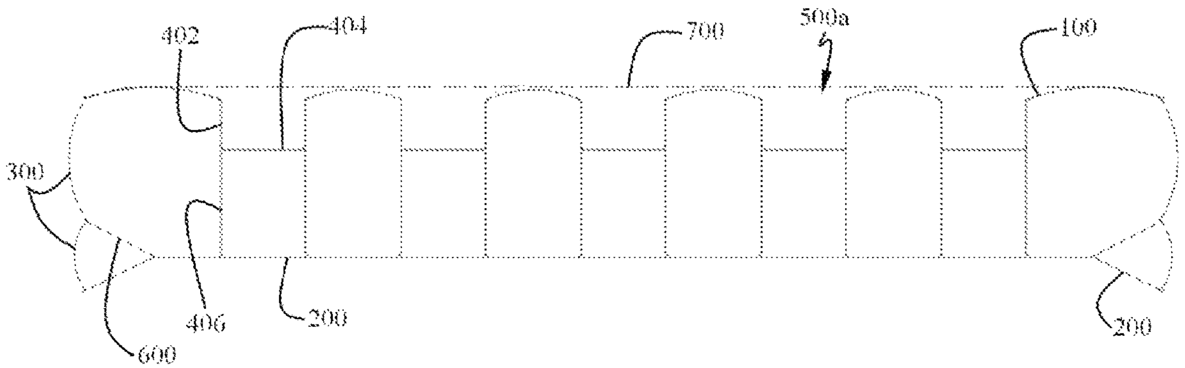
FIG. 5 is a sectional view of an inflatable bed according to an example embodiment.

As shown in FIGS. 4 and 5, the tensioning member may comprise a upper tensioning part and a lower tensioning part. The upper tensioning part comprises a upper side wall 402 and a bottom 404, an upper edge of the upper side wall 402 is connected to a periphery of the hole 102 in the top sheet 100, and a lower edge of the upper side wall 402 is connected to the bottom 404; and the lower tensioning part is connected to the bottom 404 of the upper tensioning part and to the bottom sheet 200, so that when the inflatable bed is in an inflated state, the hole 102 and the upper tensioning part can form a recess 500*a* on the surface of the inflatable bed.

In some embodiments, not shown in the accompanying drawings, the upper tensioning part comprises the upper side wall 402 and the bottom 404, and the lower tensioning part comprises a top and a lower side wall. The top is connected to the bottom 404 of the upper tensioning part, and an upper edge and a lower edge of the lower side wall are respectively connected to the top and to the bottom sheet 200. The upper side wall 402, the bottom 404 and the through hole 102 in the top sheet 100 form the recess 500*a* on the surface of the inflatable bed. The lower side wall is provided with at least one first air vent in communication with the inflatable chamber.

Figure 6:
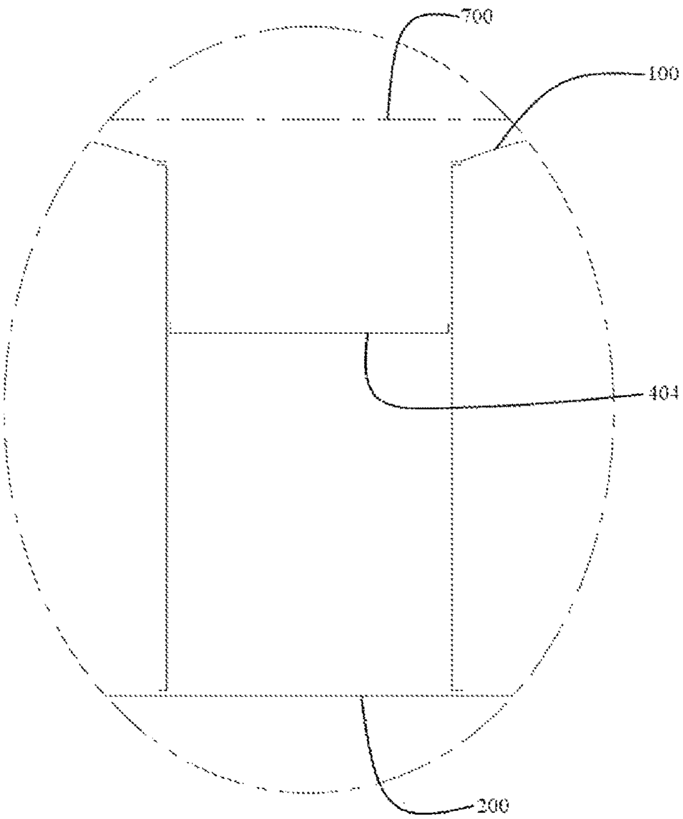
FIG. 6 is a schematic diagram of a connection of a tensioning member of the inflatable bed of FIG. 5.

In some embodiments, as shown in FIG. 3 to FIG. 6, the upper tensioning part comprises the upper side wall 402 and the bottom 404, and the lower tensioning part comprises a lower side wall 406. The lower side wall 406 has at least one second air vent 408 formed therein, and the second air vent 408 is in communication with the inflatable chamber. The lower side wall 406 of the lower tensioning part and the upper side wall 402 of the upper tensioning part may be an integrated structure, i.e., an outer edge of the bottom 404 of the upper tensioning part is connected to an inner surface of the integrated structure, thereby dividing the integrated structure into the upper side wall 402 and the lower side wall 406. As shown in FIG. 4, FIG. 5 and FIG. 6, an upper edge of the upper side wall 402 is connected to a periphery of the hole 102 in the top sheet 100, and forms a recess 500*a*, having a bottom 404, on the surface of the inflatable bed. A lower edge of the lower side wall 406 is connected to the bottom sheet 200, to form a tensioning effect at least between the bottom 404 and the bottom sheet 200.

According to one or more example embodiments, the hole 102 in the top sheet 100 may be at least one of a circular hole, a rectangular hole, and a hole having another shape.

According to one or more example embodiments, a plurality of recesses are arranged, each extending in a widthwise direction of the inflatable bed and spaced apart from each other at intervals in a lengthwise direction of the inflatable bed. Alternately, the recesses may extend in the lengthwise direction of the inflatable bed and may be spaced apart from each other at intervals in the widthwise direction of the inflatable bed. In yet another example aspect, the recesses may extend or be arranged obliquely with respect to the inflatable bed, or may extend or be arranged irregularly. There may be one, two, three, four, six or another number of recesses.

As shown with respect to the example embodiments of FIG. 2 to FIG. 6, when the inflatable chamber is inflated, gas enters the lower tensioning part through the second air vent 408, so that the lower side wall 406 of the lower tensioning part stretches outward. Due to the tensioning effect formed between the lower side wall 406 and the bottom sheet 200, a recess formed by the upper side wall 402 of the upper tensioning part, the bottom 404 of the upper tensioning part and the hole 102 of the top sheet 100 has a certain depth, thus maintaining better breathability.

According to one or more example embodiments, a size of a top of the lower tensioning part may be equal to a size of the bottom 404 of the upper tensioning part, i.e., the upper edge of the lower side wall 406 may be connected to the bottom 404. Alternately, the size of the top of the lower tensioning part may be greater than a size of the bottom 404 of the upper tensioning part, and an edge of the bottom 404 may be connected to a middle part of the lower side wall 406. The connections of a top of the lower tensioning part to the bottom 404 of the upper tensioning part may be made by welding, which may contribute to production efficiency.

As shown in FIG. 3 and FIG. 5, the annular oblique draw sheet 600 is connected to the lateral confining sheet 300 and to the bottom sheet 200, to limit the shape of the lower part of the inflatable bed, by, for example, restraining an outward bulging of the lower part of the inflatable bed, so as to improve the aesthetics of the inflatable bed. The oblique draw sheet 600 has a third air vent 608 formed therethrough. The third air vent is in communication with the inflatable chamber. According to one or more example embodiments, an oblique draw sheet 600 may be connected to the lateral confining sheet 300 and to the top sheet 100, so as to limit the shape of the upper part of the inflatable bed. Accordingly, there may be a single oblique draw sheet 600 disposed in either the lower part or the upper part of the inflatable bed, or there may be both an upper oblique draw sheet 600 and a lower oblique draw sheet 600.

Figure 7:
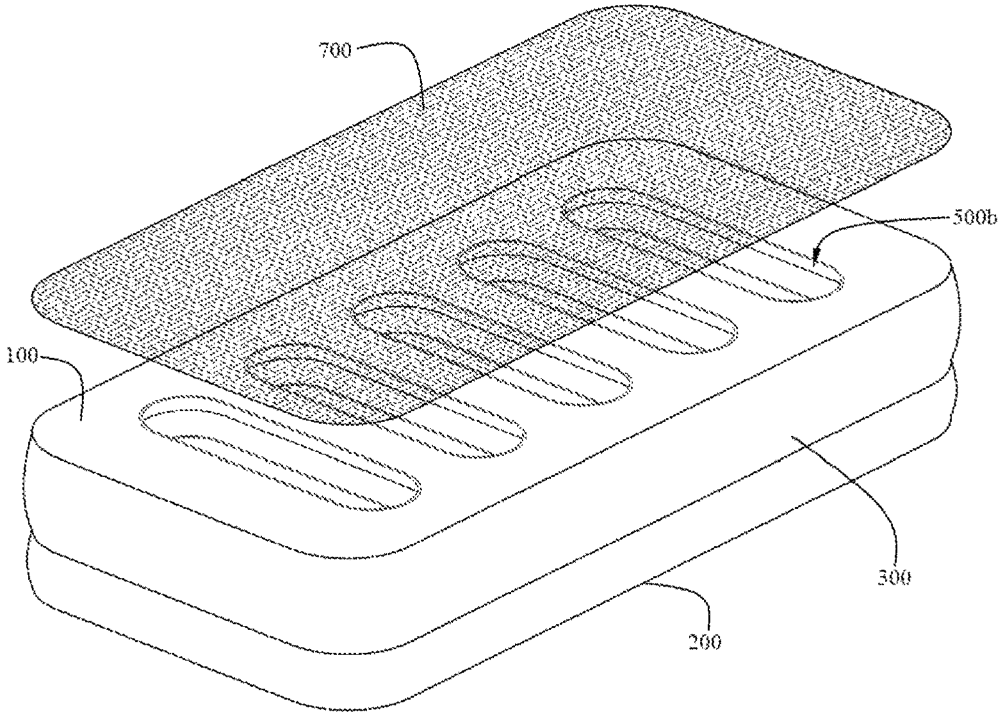
FIG. 7 is a schematic exploded view of an inflatable bed according to an example embodiment.

FIG. 7 illustrates an inflatable bed according to another example embodiment. It can be seen from FIG. 7 that recesses 500*b* are formed on the surface of the inflatable bed when it is in an inflated state. Convection of airflow can take place inside and outside the recesses 500*b*, thereby improving breathability.

Figure 8:
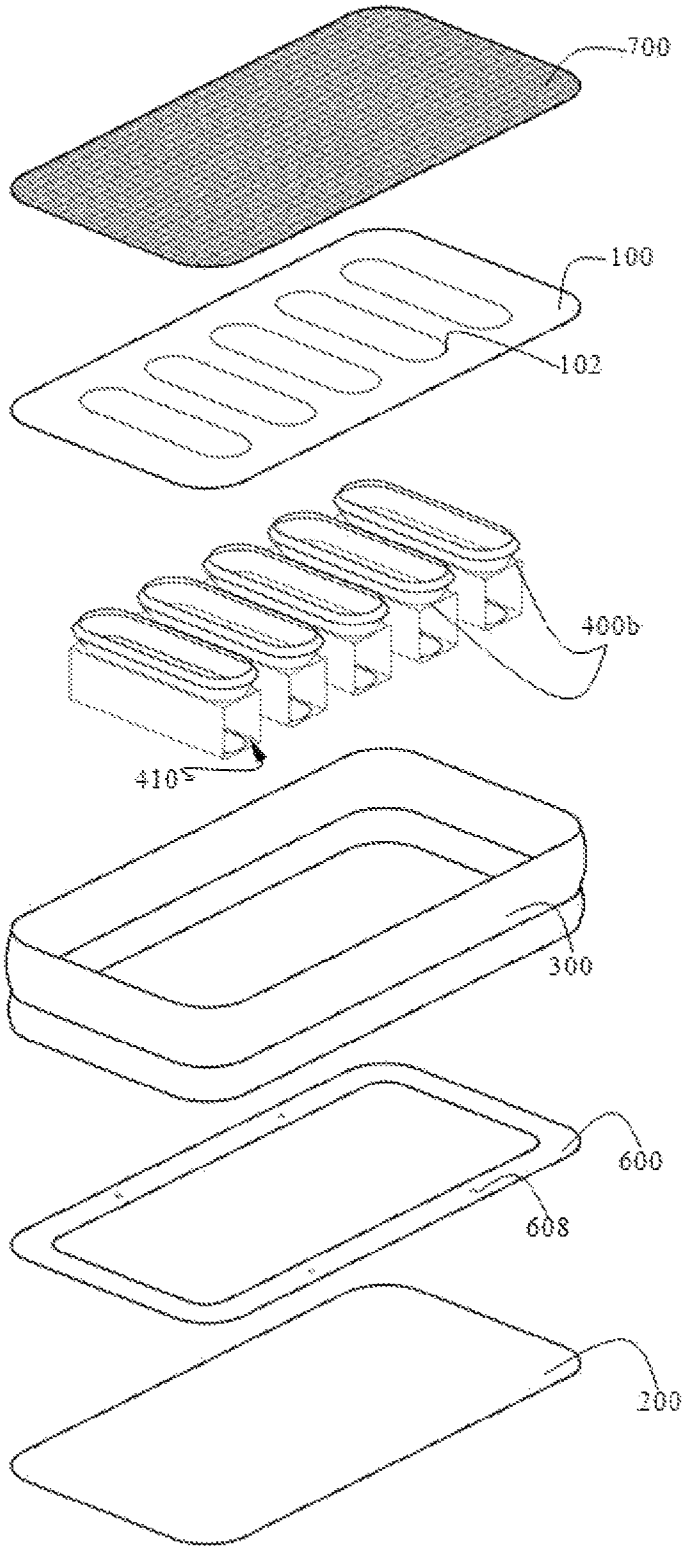
FIG. 8 is a further exploded view of the inflatable bed of FIG. 7.

FIG. 8 illustrates an exploded view of an inflatable bed according to another example embodiment. The inflatable bed of FIG. 8 comprises a breathable layer 700, a top sheet 100, a tensioning member 400*b*, a lateral confining sheet 300, an oblique draw sheet 600, and a bottom sheet 200. The top sheet 100 has a plurality of holes 102 therein, and each of the holes 102 corresponds to one of the plurality of tensioning members 400*b*. Together, a hole 102 and a corresponding tensioning member 400*b* form a recess 500*b* on the surface of the inflatable bed. The recesses 500*b* in FIG. 7 each extend in a widthwise direction of the inflatable bed and are spaced apart from each other in a lengthwise direction of the inflatable bed. The lateral confining sheet 300, the top sheet 100, the bottom sheet 200, and part of the tensioning member **400*b*, together enclose a space and thereby define an inflatable chamber. In FIG. 8, the lower part of the tensioning member is provided with an open end 410, and the open end 410 is in communication with the inflatable chamber. The oblique draw sheet 600 is connected to the lateral confining sheet 300 and to the bottom sheet 200**, to thereby limit the shape of the lower part of the inflatable bed.

Figure 9:
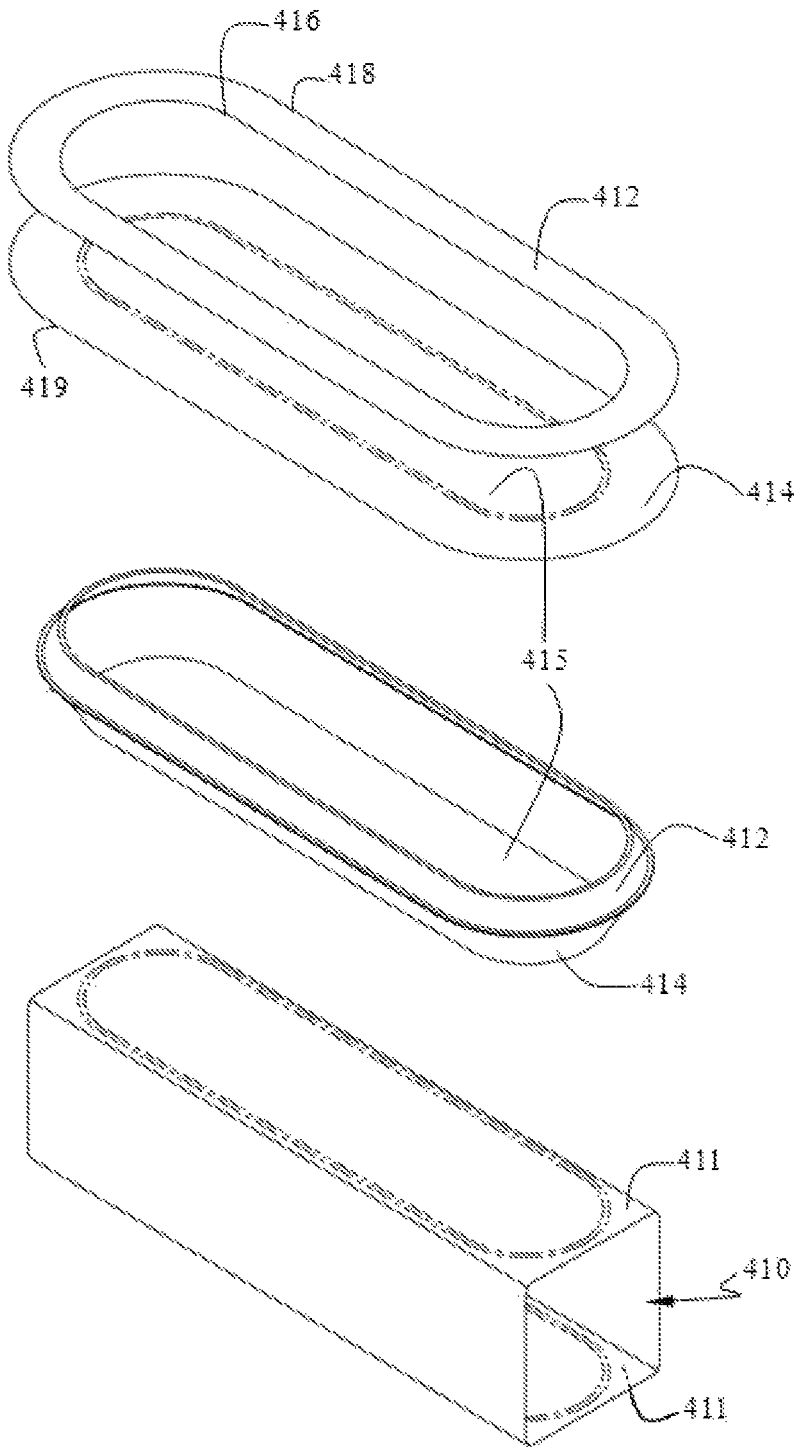
FIG. 9 is an exploded view of a tensioning member according to an example embodiment.
Figure 10:
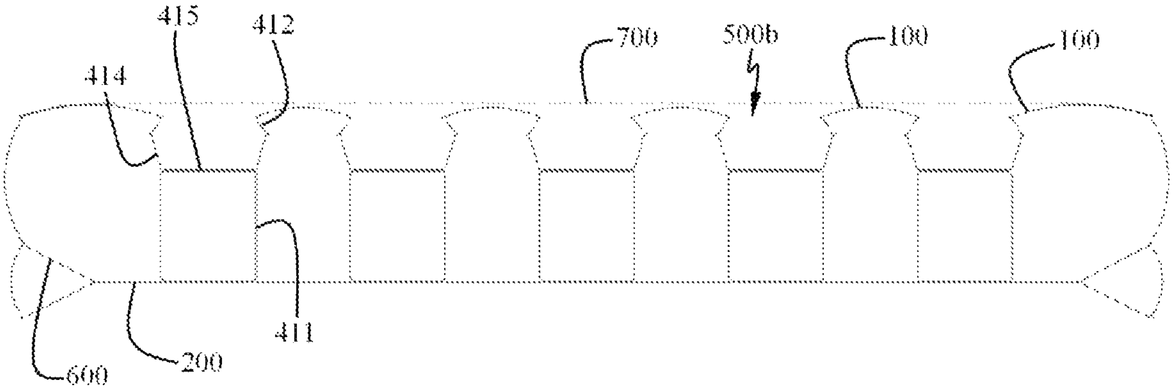
FIG. 10 is a sectional view of an inflatable bed according to an example embodiment.
Figure 11:
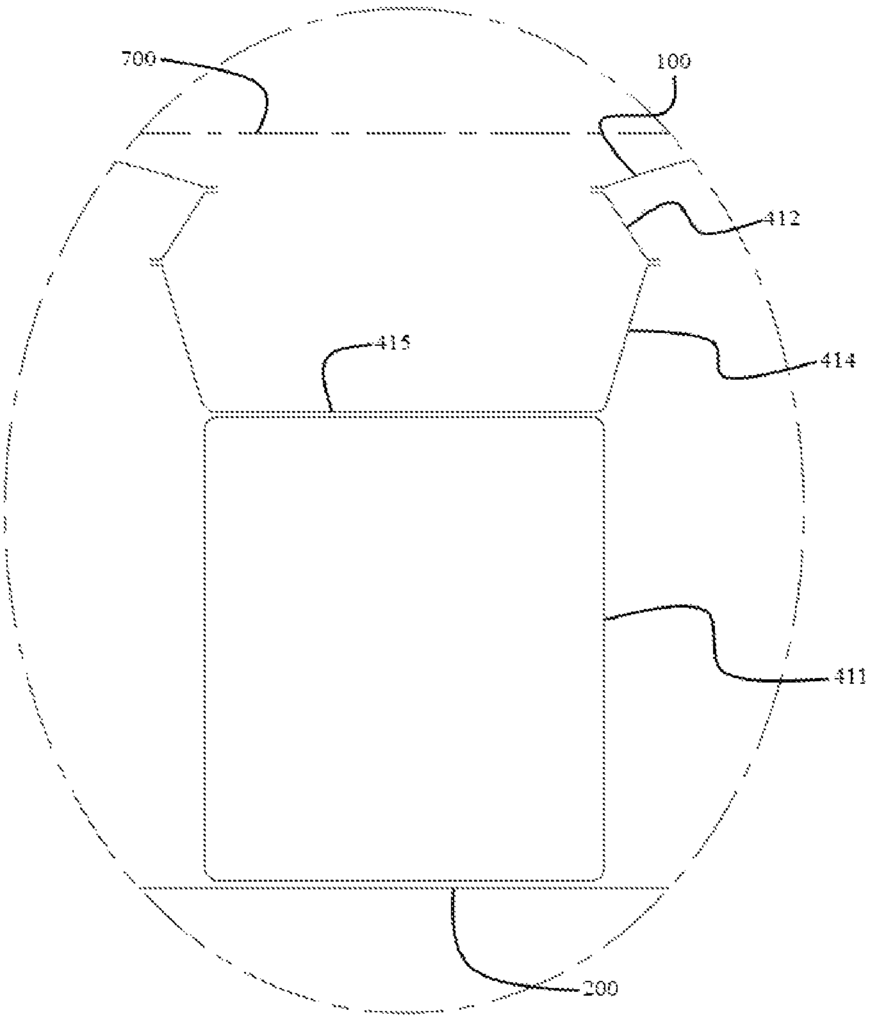
FIG. 11 is a schematic diagram of a connection of a tensioning member of the inflatable bed of FIG. 10.

A tensioning member **400*b* shown in FIG. 9 comprises a upper tensioning part and a lower tensioning part. The upper tensioning part comprises a first flat sheet 412 and a second flat sheet 414, wherein the first flat sheet 412 is an annular structure. An inner annular edge 416 of the first flat sheet 412 is connected to an inner periphery of one of the holes 102 in the top sheet 100, and an outer annular edge 418 of the first flat sheet 412 is connected to an outer edge 419 of the second flat sheet 414. The lower tensioning part is a hollow body structure, and the hollow body structure is enclosed by a circumferential wall 411 and forms an open end 410. A surface of the circumferential wall 411 is connected to a bottom surface 415 of the second flat sheet 414 and to the bottom sheet 200, and the open end 410 provides communication between the lower tensioning part and the inflatable chamber. When the inflatable bed is in an inflated state, the hole 102, the first flat sheet 412, and the second flat sheet 414, together form a recess on the surface of the inflatable bed. The bottom surface 415 of the second flat sheet 414 disposed substantially in a middle of the second flat sheet 414, with the outer edge 419 of the second flat sheet 414 disposed circumferentially around the bottom surface 415, as shown in the part enclosed by a double dashed line within the outer edge 419 of the second flat sheet 414 in FIG. 9. A shape of is illustrated the bottom surface 415 of the second flat sheet 414 may be, but is not limited to the shape enclosed by the double dashed line in FIG. 9. The bottom surface 415 is a part of the second flat sheet 414 but is not limited to being disposed in the middle of the second flat sheet 414. When the first flat sheet 412 is connected to the second flat sheet 414, and the second flat sheet 414 is connected to the lower tensioning part, outer edge parts of the first flat sheet and the second flat sheet (the outer edge part of the second flat sheet is a part outside the double dashed line) form the upper side wall of the first tensioning part, and the bottom surface 415** of the second flat sheet forms the bottom surface of the first tensioning part.

In the embodiments shown in FIG. 7 to FIG. 11, when the inflatable chamber is inflated, gas enters the hollow body structure from the open end 410, so that the hollow body structure stretches. The outer annular edge 418 of the first flat sheet 412 is connected to the outer edge 419 of the second flat sheet 414, and accordingly, the connecting part may provide a certain structural strength, thus preventing the gas in the inflatable chamber from compressing the recess and reducing the width of the recess. The recess formed by the first flat sheet 412, the second flat sheet 414 and the hole 102 has a certain width, thereby maintaining better breathability.

It should be understood that in the example embodiments shown in FIG. 7 to FIG. 11, the arrangement of the first flat sheet 412, the second flat sheet 414 and the hollow body structure may provide added convenience for welding, which may improve production efficiency.

According to one or more example embodiments, the upper tensioning part in FIG. 4 is combined with the lower tensioning part in FIG. 9 to form a tensioning member. In other words, the upper tensioning part may comprise a upper side wall and a bottom, an upper edge of the upper side wall may be connected to a periphery of the hole 102, and a lower edge of the upper side wall may be connected to the bottom. The lower tensioning part may be a hollow body structure. The hollow body structure may be enclosed by a circumferential wall and may form an open end. A surface of the circumferential wall may be connected to the bottom of the upper tensioning part and to the bottom sheet, and the open end may be in communication with the inflatable chamber. It should be understood that the arrangement of connecting the bottom to the surface of the circumferential wall of the hollow body may provide added convenience for welding, which may improve production efficiency.

The example arrangement of the upper tensioning part and the lower tensioning part may enhance the strength of the tensioning member, so as to maintain a shape of the recess after inflation, thereby maintaining better breathability. When a user touches or presses the surface of the inflatable bed, the depth and/or the width of the recess may be maintained, so that good convection is enabled inside and outside the recess, and the breathability may be improved. It should be understood that if the inside of the tensioning member is not provided with a bottom, a top or a bottom surface, e.g., the tensioning member is in the shape of a hollow cylinder, then the outside of the tensioning member may be compressed by gas during inflation. If the inside of the tensioning member is not provided with a bottom, a top or a bottom surface, the recess may deform due to compression, which may further affect the breathability and the aesthetics of the inflatable bed. Such a structure may further reduce the strength of the tensioning member, thus weakening the support it provides for the inflatable bed.

In the example embodiments shown in FIG. 1 to FIG. 11, a ratio of the height of the upper tensioning part to a height of the lower tensioning part is about 1:2. Such an arrangement further makes the recess formed by the first upper part and the hole have a certain strength, so that the shape of the inflated recess can be effectively maintained, thereby maintaining better breathability. However, this is merely an example, and according to one or more example embodiments, there may be another ratio relationship between the height of the first tensioning part and the height of the lower tensioning part, such as 1:3, 2:5, 3:5, 2:3, 1:1, 3:2 or 2:1.

According to one or more example embodiments, the breathable layer is disposed above the top sheet and is connected to the lateral confining sheet. According to other example embodiments, the top sheet and/or the lateral confining sheet may be provided with a connecting part, such as a buckle, and an edge of the breathable layer may be connected to the top sheet and/or the lateral confining sheet via the connecting part.

According to one or more example embodiments, a shape of a cross section of the oblique draw sheet may be, but is not limited to, an I shape, a Y shape and a V shape.

According to one or more example embodiments, the inflatable bed has a multi-layer structure, i.e., an inflatable bed with a multi-layer structure is formed. Recesses are located on a surface of a first layer of the multi-layer inflatable bed, and the layers of the multi-layer inflatable bed are communicated with each other.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. An inflatable bed, comprising:

a top sheet having a hole therethrough;

a bottom sheet;

a lateral confining sheet comprising an upper edge connected to an outer circumferential edge of the top sheet, and a lower edge connected to an outer circumferential edge of the bottom sheet; and at least one tensioning member comprising:

an upper tensioning part comprising: an upper edge connected to an inner periphery of the hole through the top sheet, and a bottom surface; and a lower tensioning part, the lower tensioning part connected to the bottom surface of the upper tensioning part and to the bottom sheet;

wherein the upper tensioning part, the top sheet, the bottom sheet, and the lateral confining sheet are connected together thereby defining an enclosed inflatable chamber.

2. The inflatable bed according to claim 1, wherein: the lower tensioning part comprises:

a top connected to the bottom surface of the upper tensioning part, and a lower side wall comprising an upper edge connected to the top and a lower edge connected to the bottom sheet, wherein the lower side wall has an air vent formed therethrough, the air vent in communication with the inflatable chamber.

3. The inflatable bed according to claim 1, wherein the lower tensioning part comprises:

a lower side wall having an air vent formed therethrough, the air vent in communication with the inflatable chamber, wherein the upper tensioning part and the lower side wall of the lower tensioning part together comprise a single integrated structure.

4. The inflatable bed according to claim 1, wherein the lower tensioning part is a hollow body structure defined by a circumferential wall connected to the bottom surface of the upper tensioning part and to the bottom sheet, the hollow body structure comprising an open end providing communication between the inflatable chamber and an interior of the hollow body structure.

5. The inflatable bed according to claim 4, wherein the first tensioning part comprises:

an annular structure having an inner circumference defining the upper edge of the upper tensioning part and an outer circumference; and a flat sheet having an outer, annular area having an outer circumference connected to the outer circumference of the annular structure and an inner area defining the bottom surface of the upper tensioning part.

6. The inflatable bed according to claim 1, wherein the hole through the top sheet is one of circular, quadrilateral, and kidney-shaped.

7. The inflatable bed according to claim 1, further comprising:

an oblique draw sheet comprising a first edge connected to one of the top sheet and the bottom sheet and a second edge connected to the lateral confining sheet, the oblique draw sheet having an air vent formed therethrough, the air vent in communication with the inflatable chamber.

8. The inflatable bed according to claim 7, wherein a cross sectional shape of the oblique draw sheet is one of an I shape, a Y shape, and a V shape.

9. The inflatable bed according to claim 1, further comprising:

a breathable layer substantially covering the top sheet and connected to at least one of the top sheet and the lateral confining sheet, wherein the breathable layer is gas-permeable.

10. The inflatable bed according to claim 9, further comprising a connecting part connecting the breathable layer to the at least one of the top sheet and the lateral confining sheet.

11. An inflatable structure comprising:

a top sheet having a plurality of holes therethrough;

a bottom sheet;

a lateral confining sheet comprising an upper edge connected to an outer periphery of the top sheet and a bottom edge connected to an outer periphery of the bottom sheet;

a plurality of tensioning members, each comprising:

a tubular structure comprising an upper edge connected to an inner circumferential edge of one of the plurality of holes through the top sheet and a lower edge connected to the bottom sheet; and a cross-sheet having an outer circumference attached to an inner circumference of the tubular structure, between the upper edge and the lower edge.

12. The inflatable structure according to claim 11, wherein the tubular structure of each of the plurality of tensioning members comprises:

a first annular structure comprising:

a first upper edge defining the upper edge of the tubular structure and connected to the inner circumferential edge of the one of the plurality of holes through the top sheet, a first lower edge defining the inner circumference of the tubular structure and connected to the outer circumference of the cross-sheet;

a second annular structure comprising:

a second upper edge connected to the cross-sheet, and a second lower edge defining the lower edge of the tubular structure and connected to the bottom sheet.

13. The inflatable structure according to claim 12, wherein an air vent is formed through the second annular structure.

14. The inflatable structure according to claim 12, further comprising an oblique draw sheet comprising an annular structure comprising an inner circumferential edge connected to one of the top sheet and the bottom sheet and an outer circumferential edge connected to the lateral confining sheet.

15. The inflatable structure according to claim 11, further comprising:

a breathable layer substantially covering the top sheet and connected to at least one of the top sheet and the lateral confining sheet, wherein the breathable layer is gas permeable.

16. An inflatable structure comprising:

a top sheet having a plurality of holes therethrough;

a bottom sheet;

a lateral confining sheet comprising an upper edge connected to an outer periphery of the top sheet and a bottom edge connected to an outer periphery of the bottom sheet;

a plurality of tensioning members, each comprising:

an upper tensioning part comprising a tubular structure comprising an upper edge connected to an inner circumferential edge of one of the plurality of holes through the top sheet and a lower edge;

a lower tensioning part comprising an upper surface connected to the lower edge of the upper tensioning part, a lower surface connected to the bottom sheet, and at least two side surfaces each connected between the upper surface and the lower surface, wherein an inner space defined by the upper surface, the lower surface, and the at least two side surfaces are in communication with an inflatable chamber defined by the top sheet, the bottom sheet, and the lateral confining sheet.

17. The inflatable structure according to claim 16, wherein the tubular structure of the upper tensioning part comprises:

an annular structure comprising an upper edge defining the upper edge of the upper tensioning part, and a lower edge;

a sheet comprising an outer circumferential edge connected to the lower edge of the annular structure;

wherein the lower edge of the upper tensioning part is defined as a ring on the sheet within the outer circumferential edge of the sheet.

18. The inflatable structure according to claim 16, wherein the at least two side sheets of the lower tensioning part comprise three side sheets connected between the upper surface and the lower surface of the lower tensioning part on three sides, respectively.

19. The inflatable structure according to claim 16, further comprising an oblique draw sheet comprising an oblique annular structure comprising an inner circumferential edge connected to one of the top sheet and the bottom sheet and an outer circumferential edge connected to the lateral confining sheet.

20. The inflatable structure according to claim 16, further comprising a breathable layer substantially covering the top sheet and connected to at least one of the top sheet and the lateral confining sheet, wherein the breathable layer is gas-permeable.

* * * * *